US 7,257,739 B2

(12) United States Patent
Quinlan

(10) Patent No.: US 7,257,739 B2
(45) Date of Patent: Aug. 14, 2007

(54) DIAGNOSIS OF LINK FAILURES IN A NETWORK

(75) Inventor: Una Quinlan, Dublin (IE)

(73) Assignee: 3Com Corporation, Marlborough, MA (US)

( * ) Notice: Subject to any disclaimer, the term of this patent is extended or adjusted under 35 U.S.C. 154(b) by 533 days.

(21) Appl. No.: 09/924,955

(22) Filed: Aug. 8, 2001

(65) Prior Publication Data

US 2002/0021671 A1    Feb. 21, 2002

(30) Foreign Application Priority Data

Aug. 14, 2000    (GB)    ................................ 0020004.8

(51) Int. Cl.
G06F 11/00    (2006.01)
(52) U.S. Cl. ........................... 714/43; 398/25; 370/232
(58) Field of Classification Search ................. 714/43, 714/56; 398/25; 370/232
See application file for complete search history.

(56) References Cited

U.S. PATENT DOCUMENTS 5,884,041 A * 3/1999 Hurwitz ....................... 709/228
6,728,216 B1 * 4/2004 Sterner ........................ 370/252

FOREIGN PATENT DOCUMENTS

| EP | 0 939 511 | 9/1999 |
| EP | 0 939 512 | 9/1999 |
| EP | 0 939 512 A2 * | 9/1999 |
| GB | 2 355 373 | 4/2001 |

* cited by examiner

Primary Examiner—Bryce P. Bonzo

(57) ABSTRACT

A method of diagnosing, in a network comprising two devices (A), (B) connectable by a link (20), which link may be a physical link such as a cable or may be a wireless link, the type of failure of the connection between the devices (referred to as "link failure", although the failure may only be a partial failure such as lack of synchronization and may lie not in the link itself but in the one or both devices or the protocol used), said method comprising connecting the two devices together (for example, by physically connecting them or switching on the link between them), at least one (B) of the devices including a plurality of registers (23), each register being adapted to store data about one or more types of said failure, running an auto-negotiation sequence, detecting said failure and passing signals relating to that failure to the relevant register(s), interrogating the or each register, and determining the type of said failure.

Examples of link failure are:
  loss of light;
  bit/word alignment failure;
  loss of synchronization during auto-negotiation;
  auto-negotiation protocol hang during base page exchange;
  auto-negotiation protocol hang during next page exchange;
auto-negotiation protocol (repeated) restart due to link partner initiating a "break link".

There may be included software for controlling the method which includes routines which are able to analyze the information from the registers (23), and to pass signals to a visual display unit (26) to display thereon a message which in accordance with the type of failure determined by the method includes a suggested course of action to overcome the failure.

12 Claims, 3 Drawing Sheets

DIAGNOSIS OF LINK FAILURES IN A NETWORK

BACKGROUND OF THE INVENTION

The present invention relates to the diagnosis of link failures in a network.

There are various standard protocols for operation of a network. We will be describing an arrangement which uses Ethernet in the gigabit range (protocol IEEE 803.2—1000BASE-X), although the principle may be applied to other protocols.

As is well known, 1000BASE-X networks operate on optical fibre full duplex links. Under the IEEE Standard 802.3, two devices when initiating communication with one another across a network ("handshaking") allow the devices to exchange information about their abilities. At its simplest, it is necessary for the two devices to be aware of the level (eg speed) of protocol at which they each operate so as to chose the highest speed protocol common to each of them This process which involves the exchange of "pages" of information with each other, and which is referred to as auto-negotiation thus provides automatic speed matching for devices which are capable of operating at a variety of speeds in accordance with a variety of protocols.

Link failures may happen in a network at any time and various proposals have been made to determine the cause of such link failures. However, there is a particular problem in a special circumstance as follows. When a manufacturer designs a new component to operate in such a network in accordance with a pre-determined protocol, it is sometimes found that there are problems whereby the new component does not link properly with the reminder of the network. Two matters can make identification of a problem more difficult. Firstly, device never connects properly and secondly the protocol is a new one.

The difficulty in this particular case is that one has little experience to determine what the problem might be, particularly if the link does not start or simply goes down.

Examples of link failure are:

loss of light;

bit/word alignment failure;

loss of synchronisation during auto-negotiation;

auto-negotiation protocol hang during base page exchange;

auto-negotiation protocol hang during next page exchange;

auto-negotiation protocol (repeated) restart due to link partner initiating a "break link".

In copper or optical fibre links, the management interface to the PHY device (physical layer) provides minimal visibility of link failures. So far as the interface is concerned, the link is either "up" or "down" or "was down but has since come up". Testing one manufacturer's products ability to co-operate with another competitor's products using the relevant protocol can render it difficult to isolate faults when failure occurs.

There are networks analysers which can be purchased, which offer link diagnostic capabilities, but such devices do not usually exist in the early stages of a new protocol, for example gigabit Ethernet. Also such devices do not necessarily reflect the true state of the link nodes. There is a particular problem in understanding auto-negotiation breakdown.

SUMMARY OF THE INVETION

The preferred embodiment of the invention provides a method of diagnosing, in a network comprising two devices connectable by a link (which link may be a physical link such as a cable or may be a wireless link), the type of failure of the connection between the devices (referred to as "link failure", although the failure may only be a partial failure such as lack of synchronisation and may lie not in the link itself but in the one or both devices or the protocol used), said method comprising connecting the two devices together (for example, by physically connecting them or switching on the link between them), at least one of the devices including a plurality of registers, each register being adapted to store data about one or more types of said failure, running an auto-negotiation sequence, detecting said failure and passing signals relating to that failure to the relevant register(s), and interrogating the or each register, and determining the type of said failure.

Preferably, the step of determining the type of said failure includes the step of determining the data in the relevant register(s) and from said data, indicating the type of said failure and/or a proposed course of action.

Preferably, there is provided a visual display unit and the step of determining the type of said failure includes the step of determining the data in the relevant register(s) and from said data, indicating the type of said failure and/or a proposed course of action on said visual display unit.

Preferably, said failure comprises a loss of light, a bit/word alignment failure or a loss of synchronisation during auto-negotiation or an auto-negotiation protocol hang during base page exchange an auto-negotiation protocol hang during next page exchange or an auto-negotiation protocol (repeated) restart due to initiation of a "break link".

Preferably, the steps of interrogation and of determining are controlled by a program on a device in the network.

Preferably, the steps of interrogation and of determining are controlled by a program on one of said devices.

Preferably, said detection step is carried out by signal detector logic in level B1 of the OSI protocol stack of one of said devices.

Preferably, the link is a fibre optic signal and light is detected by a transceiver and the detector logic in a sub level of level B1 of the OSI protocol stack checks for an adequate power level on the light received at the transceiver.

Preferably, said signal detector logic in a sub level of level B1 of the OSI protocol stack of one of said devices deals with clock recovery, comma alignment and receive synchronisation so as to check the received signal frequency, encoding integrity and correct alignment of received signals.

Preferably, said signal detector logic in a sub level of level B1 of the OSI protocol stack of one of said devices includes a bit error counter to count symbol errors. Preferably, said bit error counter is set at regular intervals, to provide bit error rate calculations.

Preferably, said signal detector logic in a sub level of level B1 of the OSI protocol stack of one of said devices includes an auto negotiation state machine which deals with the exchange of one or more pages of information between the two devices, handles link restarts by the link partner, and reports the link state and hangs.

BRIEF DESCRIPTION OF THE DRAWINGS

A preferred embodiment of the invention will now be described by way of example only and with reference to the accompanying drawings in which.

DESCRIPTION OF THE PREFERRED EMBODIMENTS OF THE INVENTION

Figure 1:
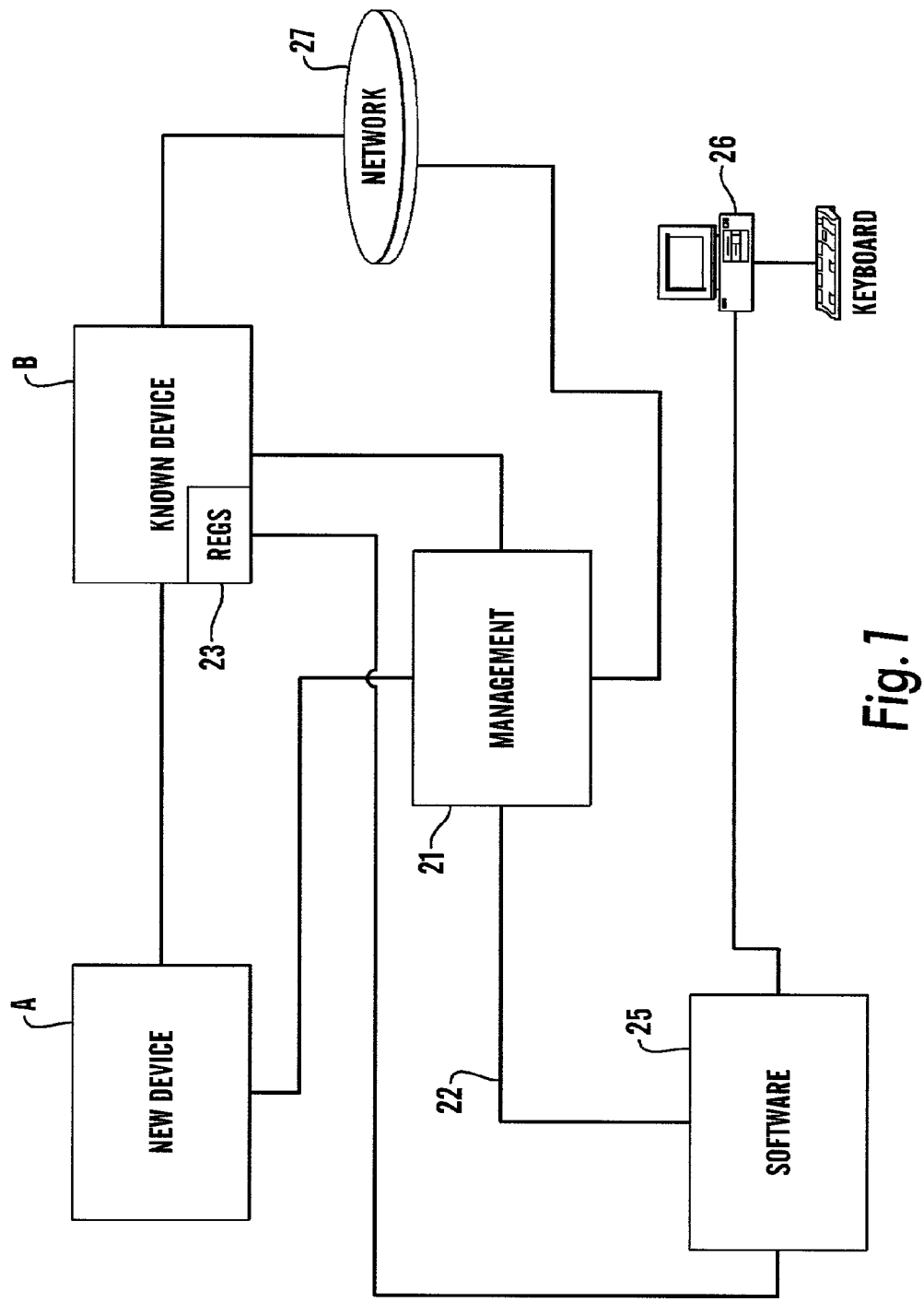
FIG. 1 is a diagrammatic view of a network containing a plurality of devices and in particular a device under test to test its compatibility with other devices.

FIG. 1 is a diagrammatic view of a network. The network is shown at 27, and it attached to a known device B having registers 23 as will be described later. A network management system is provided at 21, and there is provided software 25 which may be provided on the management system 21. The software 25 causes relevant signals to be passed to a visual display unit 26 to display relevant information.

A new device A is connected to the known device B and also to the management system 21. Both devices A and B may be network components such as network switches and may operate with the network in accordance with a relevant protocol such as 1 Gigabit 1000 Base—X.

In use the management system receives signals from the new device A, the known device B and the remainder of the network 27 and utilises the software 25 via line 22, the software 25 providing a suitable output for the visual display unit 26.

Figure 2:
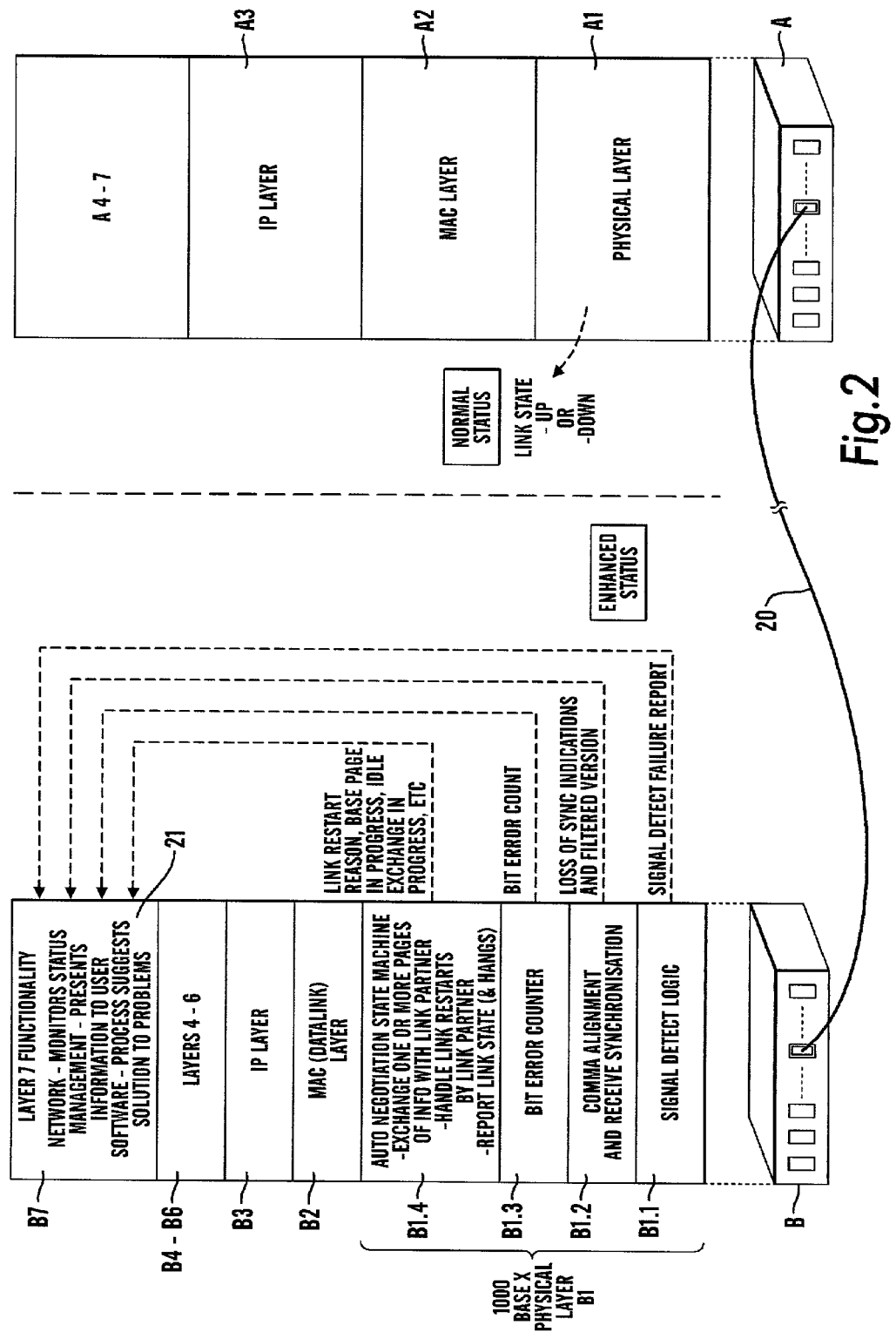
FIG. 2 is a diagram of the physical layers of two of the devices, including said device under test, linked to one another.

FIG. 2 illustrates the Open System Interconnection (OSI) (7-layer) protocol stacks for the relevant parts of the communication ports, one each of the two devices A and B. As is well known, each layer of the OSI protocol stack performs a specific data communication task and there will be communication between the corresponding layers of the two devices. The relevant information passes down the stack of layers to the physical layer which in this case is the fibre optic 20.

As is clear, device A is drawn in the standard manner of a seven layer OSI model (layers A1-A7), the bottom three layers of which are of significance in the present application and comprise the physical layer A1, the MAC (Media Access Controller), data link A2 and the IP layer A3. Device B is similar—by illustration as seven layers B1-B7 but it should be noted that the physical layer B1 in device B is sub divided into layers B1.1, B1.2, B1.3, B1.4.

Thus in layer B1.1 there may be provided signal detector logic; this checks for an adequate power level on the light received from the fibre optic 20 via the transceiver. Layer B1.2 deals with clock recovery, comma alignment and receive synchronisation; this checks the received signal quality, that is frequency, 8B/10B encoding integrity and correct alignment of received signals. In B1.3 there may be a bit error counter; this counts symbol errors, and the counter can be set at regular intervals, thus permitting bit error rate calculations. In layer B1.4 there may be provided the auto negotiation state machine which deals with the exchange of one or more pages of information between the two devices, handles link restarts by the link partner, and reports the link state and hangs.

If a link fails to come up, or is repeatedly restarting, it is extremely useful for the network manager to have some statistics about the reasons for the link failures. For example, if the fibre optic cable is damaged, which is causing a large number of bit errors to be reported, then it will be necessary to replace the fibre optic cable. However, if the signal detect failure occurs frequently, it may be caused by a loose connector on one end of the link.

Protocol errors may occur during auto-negotiation (in the early stages of implementation) resulting in interoperability problems between devices. If the system test engineers have visibility of the state of the auto-negotiation state machine, it greatly enhances their ability to debug these problems. For example, if 'device A' always restarts the link when 'device B' starts to initiate a NEXT PAGE exchange, it would suggest that the 'device A' box cannot support next page exchange (which is mandatory). If 'device B' repeatedly hangs during IDLE code exchange, it suggests the 'device A' is not implementing the IDLE handshake correctly.

When two devices A and B are initially connected, the auto-negotiation sequence is as follows:

(1) Transmit a page of zeroes for 10-20 milliseconds (link restart indication)

(2) Wait for signal detect, and receive synchronisation success indication.

(3) Transmit BASE PAGE of information. Wait to receive link partner's base page, and then acknowledge receipt of link partner base page.

(4) Transmit NEXT PAGE of information. Wait to receive link partner's next page, and then acknowledge receipt of link partner next page.

(5) If either the local node or link partner wish to proceed with further next page exchanges, continue this. When all pages are exchanged, proceed (6) For IDLE exchange, transmit IDLE codes, and wait to receive IDLE codes.

(7) Check for link partner compatibility (eg full/half duplex support) and if ok, proceed to LINK_OK state, and permit Ethernet packet transmission and reception.

As is well known, where a device is a managed device, it will conventionally contain a semi-conductor device 21 which holds a so-called device manager, the device manager monitoring the status of a link and data passing along the link. In the present invention, when the layers, for example layers B1.1-B1.4 as set out above detects particular errors, then information regarding these errors is passed to a set of registers 23 in the device B. Generally speaking there will be provided a separate register for each type of error and the register may include, for example, information about the number of errors or their frequency. These registers provide a resource relating to the errors which may be utilised in the preferred arrangement of the invention.

As is clear from FIG. 2 and in line with FIG. 1, the network management device 21 passes the information relating to the status of the link to the software 25 which then suggests solutions to the problems found. By interrogating the status registers, the network manager 21 receives information from the relevant status register 23 which stores information from B1.1 relating to signal detect failure, from the relevant status register 23 which stores information from B1.2 with respect to loss of synchronisation indications, from the relevant status register 23 which stores information from B1.3 a bit error count, and from the relevant status register 23 which stores information from B1.4 information regarding link restart reasons, base page exchange progress, and idle exchange in progress.

It will be noted that with respect to device A, the arrangement is a normal arrangement in which the physical layer A1 simply provides information stating whether the link state is up or down or was up and is now down.

Figure 3:
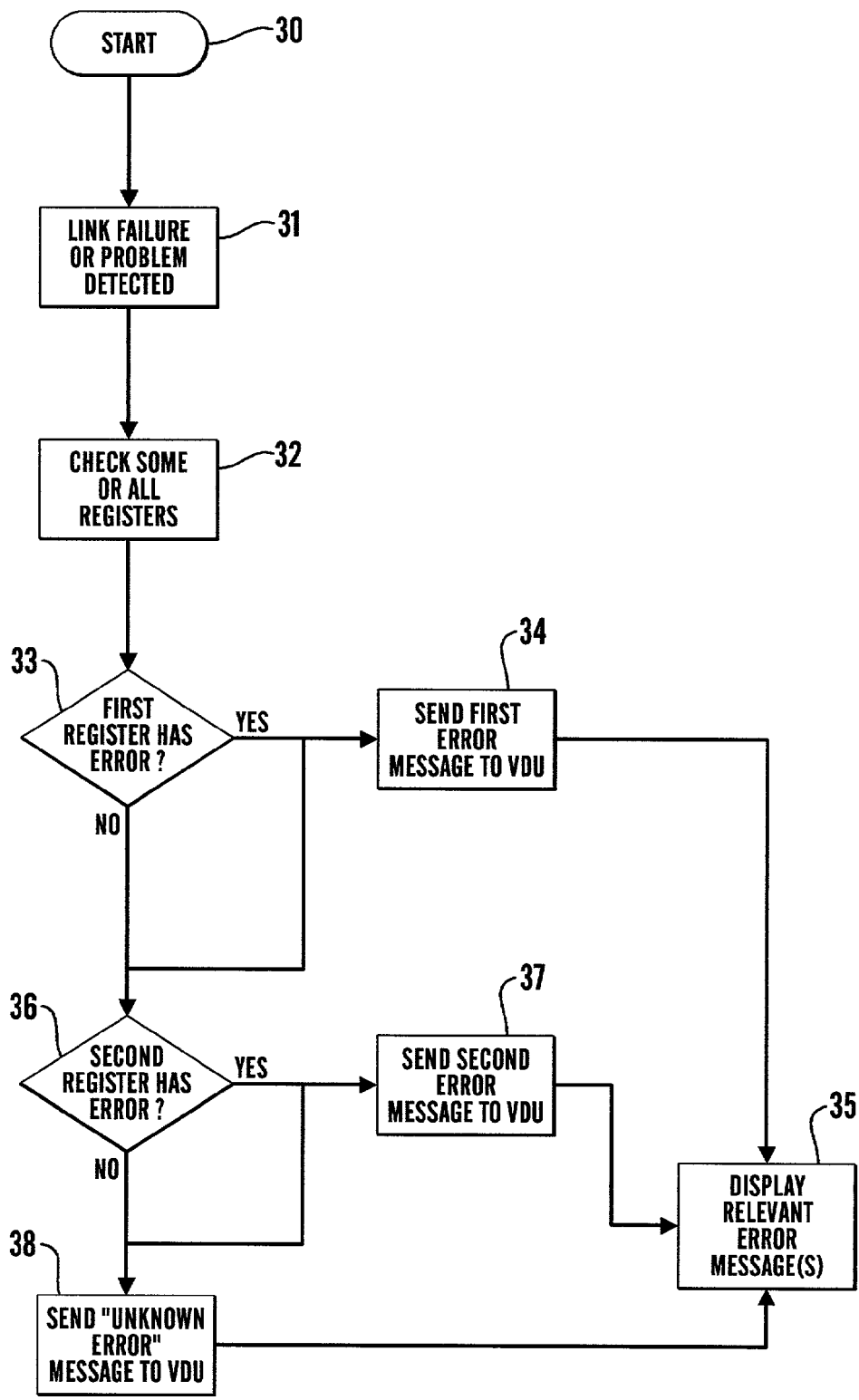
FIG. 3 is a simple flow chart of the sequence of operations carried out by the device and/or the software to identify and diagnose link failure.

Referring to FIG. 3, the software 25 is adapted to carry out the following functions.

Thus, the software will, on receiving a signal from the network manager 21 via link 22, interrogate the registers indicated at 23 in the device B. The software includes routines which are able to analyse the information from the registers 23, and to pass signals to VDU 26 to display thereon a message including a suggested course of action to overcome the problem.

Thus, for example, detecting from the relevant register that there has been a signal failure would cause the software in the computer 25 to indicate on the VDU 26 that there is a physical link failure and suggest checking for a break in the fibre or poor connection at either end.

The software 25 in the network manager 21 operates as shown in FIG. 3. When the management system detects a link failure or other fault (step 31), this is passed from the network manager 21 along link 22 to computer 25 which in step 32 checks and downloads the contents of at least some of the various status registers. In a sub-routine, the information from the first register is then checked against a predetermined standard in step 33 to determine whether it indicates an error. If the error is indicated by the information in the first register, then in step 34 a suitable message is passed to the VDU 26 to display a proposed course of action in step 35.

If, however, the information in the first register does not indicate an error, then the software passes to the second step and looks at the information from the second register and if after carrying out a sub routine the software determines that that register contains error information in step 36, in step 37 a suitable message is passed to the VDU for display.

FIG. 3 only indicates consideration of information from a first and second register in steps 33 and 36 but clearly there may be provided a number of other steps for considering information from other registers. If after consideration of the information from all of the registers a fault cannot be determined then in step 38 the VDU is instructed to display a message indicating that there is an unknown error.

FIG. 3 shows the process at its simplest. Each step 33, 36 includes a sub routine which compares the relevant information from the register with known parameters; furthermore the software may provide a more intelligent answer in the sense that it may also review the contents of more than one register simultaneously since a particular type of fault may cause an error signal to be provided in more than one register.

The invention is not restricted to the details of the foregoing example.

The invention claimed is:

1. A method of diagnosing, in a network comprising two devices connectable by a link, a failure of the connection between the devices, said method comprising:
   connecting the two devices together, at least one of the devices including a plurality of registers, the plurality of registers including at least one each of a first register configured to receive error signals associated with a physical link failure and a second register configured to receive error signals associated with an auto-negotiation protocol failure;
   running an auto-negotiation sequence,
   detecting a failure and passing an error signal associated with the detected failure to the relevant first or second register;
   interrogating each register to determine whether the detected failure is based on a physical link failure or an auto-negotiation protocol failure.

2. The method of claim 1, further comprising:
   displaying a message identifying the failure and/or a proposed course of action on a visual display unit.

3. A method as claimed in claim 1 in which said plurality of registers includes a first register associated with a loss of light.

4. A method as claimed in claim 1 in which said plurality of registers includes a first register associated with a bit/word alignment failure.

5. A method as claimed in claim 1 in which said plurality of registers includes a second register associated with a loss of synchronization during auto-negotiation.

6. A method as claimed in claim 1 in which said plurality of registers includes a second register associated with an auto-negotiation protocol hang during base page exchange.

7. A method as claimed in claim 1 in which said plurality of registers includes a second register associated with an auto-negotiation protocol hang during next page exchange.

8. A method as claimed in claim 1 in which said plurality of registers includes a second register associated with an auto-negotiation protocol (repeated) restart due to initiation of a "break link".

9. A method as claimed in claim 1 in which the step of interrogating is controlled by a program on a device in the network.

10. A method as claimed in claim 1 in which the step of interrogating is controlled by a program on one of said devices.

11. The method of claim 1, wherein the plurality of registers includes a plurality of first registers, each configured to receive error signals associated with a different physical link failure.

12. The method of claim 1, wherein the plurality of registers includes a plurality of second registers, each configured to receive error signals associated with a different auto-negotiation protocol failure.

* * * * *